United States Patent Office 3,394,665
Patented July 30, 1968

3,394,665
NASCENT STEAM BAKING APPARATUS
Robert W. Williams, Brookville Road,
Brookville, N.Y.
Filed Aug. 12, 1965, Ser. No. 479,115
1 Claim. (Cl. 107—64)

ABSTRACT OF THE DISCLOSURE

Apparatus for forming a desirable crust on bread products that are baked from the bottom upwardly. The apparatus includes means for impinging a stream of water mist as a spray, from a position immediately inside the oven chamber inlet opening, upon the dough surface to thereby wet this surface with just the right mixture of mist and freshly made vapor or steam so as to prepare the surface for crust formation.

---

This invention relates to apparatus for baking bread and the like to form a smooth, shining and unbroken crust thereon.

In the prior art, the preferred manner of baking bread, to form a suitable crust thereon, is to employ a steaming atmosphere.

It is important to keep the top crust tender while the bread loaf or like bake goods is expanding in baking from the bottom upwardly. Hence, it is desirable to have the outside surface or skin elastic while the baking process proceeds in order to permit an expansion of this skin without rupture.

The use of steam in baking bread presents a multitude of disadvantages. Thus in using steam the following factors must be considered; height of baking chamber; direction of steam; velocity of steam, proximity of baked goods to steam jets, temperature of oven, dryness or wetness of the steam, the pressure of the steam, temperature of the dough, etc.

The present invention avoids the use of previously prepared, steam and thus the expense of expensive steam generating apparatus.

According to this invention an atomized spray of tap-water is used. Preferably the water is of from about 50° F. to 70° F. Also the spray nozzles are preferably disposed about three inches to about five inches apart.

The nozzles are similar to those used in atomizing fuel oil in fuel oil burners and preferably yield a spray cone or fan having an apical angle of from sixty degrees to one hundred twenty degrees.

The sprayed mist of this invention is quickly vaporized by the heat at the mouth of the oven to give the specific wet vapor needed to produce the necessary elastic or expandable skin on the baking dough.

Figure 1:
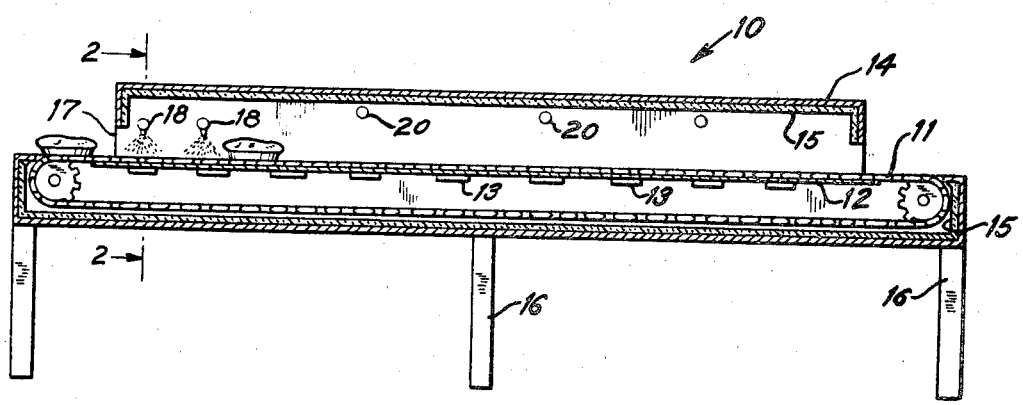
Figure 2:
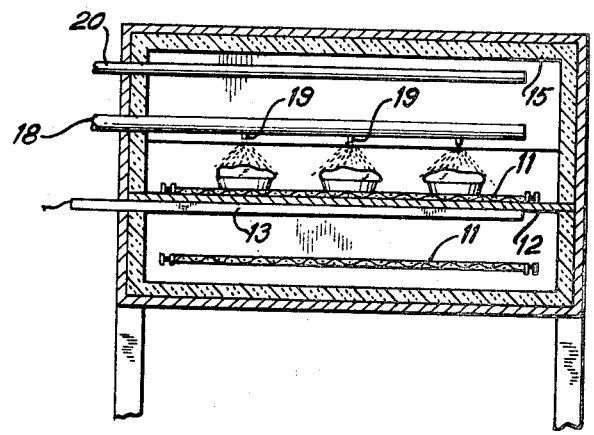

This invention is illustrated herein by means of an embodiment shown in the accompanying drawing and in which:

FIG. 1 is a longitudinal section view through a traveling chain oven, showing the location of the water atomizer, and FIG. 2 is a transverse section view taken on line 2—2 of FIG. 1 showing the manner of enveloping the baking goods with nascent steam.

This invention produces suitable nascent steam or wet vapor at the point of use around the goods being baked.

In short, the steam is substantially simultaneously made while it is being used on the dough surface.

This invention may be used in any commercial type of traveling oven such as, the revolving tray ovens, the traveling tray ovens, conveyor ovens, tunnel ovens and the like.

Preferably the high pressure wide angle atomizing nozzles used have a low flow rate, for example, about one-half gallon per hour.

Turning now to the drawing, a continuous traveling chain oven 10 is provided with a continuous chain 11 engaging a longitudinal plate 12. The plate 12 is heated by a plurality of spaced-apart electrical heaters 13 bolted in integral heat conducting contact to plate 12. Other means of heating, such as gas or oil, may be used in lieu of electricity.

The oven 10 is provided with a longitudinal hood 14 of lesser length and both the hood and the base of the oven is provided with suitable heat insulation 15.

The oven is provided with a plurality of legs 16. The bread to be baked is introduced into the oven at the mouth end 17.

As shown in the drawing the hood is provided with preferably one or at most two water lines 18 having atomizer nozzles 19 therein at suitable interval. The hood shown is provided with electrical heaters 20, but other heat means are useable, as needed.

The nozzles 19 of the high pressure water lines 18 are of the wide angle type to give a spray cone adapted to cloud the individual bake goods with immediate vaporization to produce a cloud of enveloping nascent steam.

It is this nascent steam, namely the steam produced in situ at the point of use, that is novel in producing the stretchable dough skin needed to expand without fissures or rupture.

This invention is of generic scope in that a process of baking is provided wherein nascently produced steam or vapor is used to provide a stretchable exterior skin during the baking.

I claim:
1. In a tunnel oven having an oven hood, an inlet opening and an outlet opening under said hood, an endless conveyor adapted to move bakery products from said inlet to said outlet and means for driving said conveyor, the improvement comprising a water pipe transversely disposed across said conveyor within said hood adjacent said inlet opening and in suitable spaced relationship above said conveyor; a plurality of spaced apart fan jet spray nozzles disposed in said pipe and positioned above said conveyor whereby said bakery products are enveloped in a stream of mixed water mist and freshly formed steam to produce an atmosphere and dough surface especially suitable for being glazed on further travel in said oven.

References Cited

UNITED STATES PATENTS

| 1,169,023 | 1/1916  | Embrey  | 107—54 |
| 2,141,591 | 12/1938 | Bonner  | 107—54 |
| 2,502,172 | 3/1950  | Paulsen | 107—54 XR |
| 2,767,667 | 10/1956 | Spooner | 107—54 |
| 2,942,562 | 6/1960  | Luc     | 107—54 |

WALTER A. SCHEEL, *Primary Examiner.*
ARTHUR O. HENDERSON, *Assistant Examiner.*